US009400816B1

(12) United States Patent
Gubarev et al.

(10) Patent No.: US 9,400,816 B1
(45) Date of Patent: Jul. 26, 2016

(54) SYSTEM FOR INDEXING COLLECTIONS OF STRUCTURED OBJECTS THAT PROVIDES STRONG MULTIVERSIONING SEMANTICS

(71) Applicant: GOOGLE INC., Mountain View, CA (US)

(72) Inventors: Andrey Gubarev, Mountain View, CA (US); Eric Veach, Mountain View, CA (US); Alexander Thomson, Mountain View, CA (US); Nathan Bales, Mountain View, CA (US); Laramie Leavitt, Mountain View, CA (US); Dale Woodford, Mountain View, CA (US); Sergey Melnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 14/144,031

(22) Filed: Dec. 30, 2013

Related U.S. Application Data

(60) Provisional application No. 61/770,980, filed on Feb. 28, 2013.

(51) Int. Cl.
*G06F 17/30* (2006.01)
(52) U.S. Cl.
CPC ............................. *G06F 17/30321* (2013.01)
(58) Field of Classification Search
None
See application file for complete search history.

(56) References Cited

U.S. PATENT DOCUMENTS

| 6,047,283 | A  | * | 4/2000 | Braun   | G06F 17/30625 |
| 6,732,125 | B1 | * | 5/2004 | Autrey  | G06F 11/1466 707/640 |
| 2005/0004924 | A1 | * | 1/2005 | Baldwin | G06F 17/30327 |

OTHER PUBLICATIONS

O'Neil, The log-structured merge-tree (LSM-tree) Acta Informatica 33, 1996, pp. 351-385.*
Binder, Multiversion Concurrency Control for Multidimensional Index Structures, DEXA 2007, LNCS 4653, 2007, pp. 172-181.*

* cited by examiner

*Primary Examiner* — Albert Phillips, III
(74) *Attorney, Agent, or Firm* — Honigman Miller Schwartz and Cohn LLP

(57) ABSTRACT

A multiversioned position-space indexing system is disclosed. The system includes data structures for maintaining a multiversioned position space including a multi-versioned filter merge list which represents many versions of a changing position space in a very compact form and a position shift map which describes how to translate stored positions in many different log-structured merge tree layers into logical positions at a particular timestamp. Each log-structured merge tree layer can be divided into two sublayers: a final sublayer and a correction sublayer. The final sublayer contains index entries added after the layer's start timestamp and remain live as of the layer's final timestamp as well as deletion makers for index entries that were inserted before the layer's start timestamp, but deleted before the layer's final timestamp. The correction layer contains index entries that were both created and deleted between the start and end timestamps of the layer.

18 Claims, 17 Drawing Sheets

```
{"description":"A representation of the works of Shakespeare",
 "type":"object",
 "properties":{
      "play":{
          "description": "a representation of one of Shakespeare's plays",
          "type":"object",
          "properties":{
             "act":{
                "description": "a description of a play's act",
                "type": "object",
                "properties": {
                    "scene":{
                    "type":"object",
                    "description": "a representation of an act's scene.
                    "properties": {
                         line:{
                           "type":"object",
                           "description": "a representation of a scene's line.
                           "properties": {
                               "speaker":{"type":"string"},
                               "text":{"type":"string"}
                                }
                              }
                            }
                       }
                  }
              }
         }
     }
```

FIG. 1a

| KEY | VALUE |
|---|---|
| play(32).title | 'Hamlet' |
| play(32).act(1).scene(3).line(78).speaker | 'Polonius' |
| play(32).act(1).scene(3).line(78).text(0) | 'to' |
| play(32).act(1).scene(3).line(78).text(1) | 'thine' |
| play(32).act(1).scene(3).line(78).text(2) | 'own' |
| play(32).act(1).scene(3).line(78).text(3) | 'self' |
| play(32).act(1).scene(3).line(78).text(4) | 'be' |
| play(32).act(1).scene(3).line(78).text(5) | 'true' |
| play(32).act(3).scene(1).line(55).speaker | 'Hamlet' |
| play(32).act(3).scene(1).line(55).text(0) | 'to' |
| play(32).act(3).scene(1).line(55).text(1) | 'be' |
| play(32).act(3).scene(1).line(55).text(2) | 'or' |
| play(32).act(3).scene(1).line(55).text(3) | 'not' |
| play(32).act(3).scene(1).line(55).text(4) | 'to' |
| play(32).act(3).scene(1).line(55).text(5) | 'be' |

Figure 2

| COLUMN | VALUE | KEY |
|---|---|---|
| play.act.scene.line.speaker | 'Hamlet' | 32.3.1.55 |
| play.act.scene.line.speaker | 'Polonius' | 32.1.3.78 |
| play.act.scene.line.text | 'be' | 32.1.3.78.4 |
| play.act.scene.line.text | 'be' | 32.3.1.55.1 |
| play.act.scene.line.text | 'be' | 32.3.1.55.5 |
| play.act.scene.line.text | 'not' | 32.3.1.55.3 |
| play.act.scene.line.text | 'own' | 32.1.3.78.2 |
| play.act.scene.line.text | 'or' | 32.3.1.55.2 |
| play.act.scene.line.text | 'self' | 32.1.3.78.3 |
| play.act.scene.line.text | 'thine' | 32.1.3.78.1 |
| play.act.scene.line.text | 'to' | 32.1.3.78.0 |
| play.act.scene.line.text | 'to' | 32.3.1.55.0 |
| play.act.scene.line.text | 'to' | 32.3.1.55.4 |
| play.act.scene.line.text | 'true' | 32.1.3.78.5 |
| play.title | 'Hamlet' | 32 |

| COLUMN | VALUE | POSITION |
|---|---|---|
| play.act.scene.line.speaker | 'Hamlet' | 8 |
| play.act.scene.line.speaker | 'Polonius' | 1 |
| play.act.scene.line.text | 'be' | 6 |
| play.act.scene.line.text | 'be' | 10 |
| play.act.scene.line.text | 'be' | 14 |
| play.act.scene.line.text | 'not' | 12 |
| play.act.scene.line.text | 'own' | 4 |
| play.act.scene.line.text | 'or' | 11 |
| play.act.scene.line.text | 'self' | 5 |
| play.act.scene.line.text | 'thine' | 3 |
| play.act.scene.line.text | 'to' | 2 |
| play.act.scene.line.text | 'to' | 9 |
| play.act.scene.line.text | 'to' | 13 |
| play.act.scene.line.text | 'true' | 7 |
| play.title | 'Hamlet' | 0 |

Figure 4a

| COLUMN | RANGE | KEY |
|---|---|---|
| play | [0, 15) | 32 |
| play.act | [1, 8) | 32.1 |
| play.act | [8, 15) | 32.3 |
| play.act.scene | [1,8) | 32.1.3 |
| play.act.scene | [8,15) | 32.3.1 |
| play.act.scene.line | [1,8) | 32.1.3.78 |
| play.act.scene.line | [1,8) | 32.3.1.55 |
| play.act.scene.line.speaker | [1,2) | 32.3.1.55 |
| play.act.scene.line.speaker | [8,9) | 32.1.3.78 |
| play.act.scene.line.text | [2,8) | 32.3.1.55 |
| play.act.scene.line.text | [9,15) | 32.3.1.55 |
| play.title | [0,1) | 32 |

```
          [LAYER]    [OPERATION]    [COUNT]
         /              |               \
        /               |                \
denotes whether the     |     specifies how many
operation is applied    |     positions in LAYER's
to the newer layer (N)  |     local position space
or the older layers (O) |     this operation affects
                        |
         specifies whether COUNT positions
         from LAYER are included (+) in the
         global position space or skipped (-)
```

Figure 9

| | | |
|---|---|---|
| layer 1 final | O+ \|A\| <br> N+ \|B\| <br> O+ \|EF\| | $(-\infty, \infty)$ <br> $[T_{30}, \infty)$ <br> $(-\infty, \infty)$ |
| layer 1 correction | O+ \|A\| <br> O+ \|B\| <br> N+ \|D\| <br> O+ \|EF\| | $(-\infty, \infty)$ <br> $[T_{30}, \infty)$ <br> $[T_{30}, T_{35})$ <br> $(-\infty, \infty)$ |
| layer 2 final | O+ \|AB\| <br> N+ \|C\| <br> O+ \|E\| <br> O+ \|F\| | $(-\infty, \infty)$ <br> $[T_{50}, \infty)$ <br> $(-\infty, \infty)$ <br> $(-\infty, T_{55})$ |

FIG. 11

* # SYSTEM FOR INDEXING COLLECTIONS OF STRUCTURED OBJECTS THAT PROVIDES STRONG MULTIVERSIONING SEMANTICS

CROSS REFERENCE TO RELATED APPLICATIONS

This non-provisional application claims the benefit of U.S. Provisional Application No. 61/770,980 filed on Feb. 28, 2013. The entire contents of the above application are hereby incorporated by reference.

BACKGROUND

To handle multiple users simultaneously accessing data, many storage systems implement multiversioning, which is the ability to provide multiple versions of data at the same time. Multiversioning concurrency control (MVCC) is commonly used to achieve snapshot isolation in transactional database systems. Snapshot isolation guarantees that all reads done in a particular transaction will see a consistent view of the database and that the transaction will commit only if no transactional updates conflict with any concurrent updates that may have been made to the database since the snapshot. Many systems use locking for concurrency control and also employ multiversioning to support snapshot reads that do not block, and are not blocked by, read-write transactions. Additionally, many software applications use multiversioning in database systems to run "time-travel" queries against consistent historical snapshots, or read-only static views for a given time period, of a database for both analytical and data auditing purposes.

While multiversioning may allow simultaneous access to a storage system, indexing may be useful for making the data querying process faster for users. An index is an inverted mapping from values to the keys of data items in which those values appear. In order to query database snapshots at different points in time, multiversioning storage systems must implement indexing systems that can reconstruct the instantaneous state of this inverted value-key mapping for any specified historical timestamp.

SUMMARY

This specification describes technologies relating to indexing collections of structured objects in general, and specifically to methods and systems for multiversioned indexing that provides positional shift mapping and final and correction sublayers.

In general, one aspect of the subject matter described in this specification can be embodied in a system and method for multiversioned position-space indexing of a storage system. A second aspect of the subject matter described in this specification can be embodied in a data structure representing many versions of a changing position space for a log-structured merge tree sublayer. A third aspect of the subject matter described can be embodied in a data structure representing how to translate stored positions in many different log-structured merge tree layers into logical positions at a particular timestamp. A fourth aspect of the subject matter described can be embodied in a data structure representing an immutable layer of a log-structured merge tree.

An exemplary system includes one or more processing devices and one or more storage devices storing instructions, that when executed by the one or more processing devices, cause the one or more processing devices to execute the steps of an exemplary method. An exemplary method includes: creating an empty index; adding at least one data entry to the index; creating a new index layer that includes all data entries added since a last layer creation; dividing the index layer into sublayers; storing the index entry in the appropriate sublayer's local position space, associating the entry with the range of positions occupied by an object to which the entry corresponds; creating a global position space to expose an index snapshot; and exposing index entries and the entries' global positions in the snapshot using a mapping between each layer's local position space and the index's global position space.

An exemplary data structure specifying how to merge a log-structured merge tree layer's local position space with a combined position space of preceding log-structured merge tree layers comprises: a sequence of entries, where each entry references ranges in the layer's local position space and includes an instruction regarding how to combine the ranges represented by the entry with the position space generated by merging preceding layers' local position spaces. A second exemplary data structure representing how to translate stored positions in many different log-structured merge tree layers into logical positions at a particular timestamp comprises: at least one index entry from a sublayer of a log-structured merge tree layer and a map containing a mapping between the index entry's local position space and a global position space, the map created by using a filter merge list associated with the log-structured merge tree layer's sublayer which specifies how to merge the sublayer's position space with the combined position space of all preceding layers of the log-structured merge tree. A third exemplary data structure comprises: a final sublayer containing index entries added after the log-structured merge tree layer's start timestamp and remaining live as of the layer's final timestamp; and a correction sublayer containing index entries created and deleted between the start and end timestamps of the log-structured merge tree layer.

These and other embodiments can optionally include one or more of the following features: creating a global position space to expose an index snapshot may include creating a multiversioned filter merge list for each sublayer that may contribute to the snapshot, the multiversioned filter merge list including each element to be merged in the sublayer along with specifying how to merge the element and the time period for which the element is live, and for each sublayer merging the sublayer's position space with the combined position space for the layers preceding the sublayer; dividing the index layer into sublayers may include creating a final sublayer for the layer which specifies the index entries added after the layer's start timestamp and remain live as of the layer's final timestamp; dividing the index layer into sublayers may include creating a correction sublayer which specifies index entries that were both created and deleted between the start and end timestamps of the layer; a data structure may include a timestamp-based conditional which is associated with each entry in the data structure; an entry in a data structure may include an instruction that has a denotation regarding whether an entry is applied to a newer or older layer and an operation which specifies whether the entry is included or skipped in the global position space; the empty index may be created using a log-structured merge tree structure that comprises one or more immutable layers plus a mutable, memory-resident memlayer; the created index may be a direct index that maps <column, value> pairs directly to keys; the created index may be sorted first on value, then column, and finally key; the created index may be sorted first on column, then value, and finally key; the index may have two portions, one portion which maps <column, value> pairs to positions and a second portion that maps position ranges to keys; a filter merge list may be generated by filtering a multiversion filter merge list to include only entries that apply to a particular snapshot; and a multiversion filter merge list may include a sequence of entries where each entry references ranging in the layer's local position space, references ranges in the layer's local position space, is associated with a timestamp-based conditional, and includes an instruction regarding how to combine the ranges represented by the entry with the position space generated by merging preceding layers' local position spaces.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1a is an example of a structured data model used by an exemplary indexing system.

FIG. 2 is an example keyvalue map.

FIG. 3 is an example Column, Value, Key map.

FIG. 4a is an example Column, Value, Position map.

FIG. 4b is an example Column, Range, Key map.

FIG. 8a is an example of mapping objects to local positions.

FIG. 8b is an example of mapping objects to local positions for a snapshot at $T_{31}$ as shown in FIG. 7.

FIG. 8c is an example of mapping objects to local positions for a snapshot at $T_{61}$ as shown in FIG. 7.

FIG. 9 is an example of a filter merge list structure.

FIG. 11 is an example multi-versioned filter merge list based on the process described in FIG. 7

DETAILED DESCRIPTION

Customary multiversioned index systems may not efficiently use resources or be fast enough to support online transaction process workloads. Additionally, they do not adequately support unified indexing or compact indexing representation. Finally they are not optimized for write-heavy workloads or for reads of current or very recent data. As recognized by the inventors, there should be a multiversioned index system that is efficient and fast enough to handle large workloads.

According to an exemplary embodiment, a multiversioned indexing system may be created to support: (1) high insertion and deletion rates associated with online transaction process (OLTP) workloads, (2) fast queries of recent index snapshots, (3) excellent compression, and (4) high cache locality using a novel combination of log-structured storage and multivalued-position-space indexing. In addition to outperforming other multiversioned indexing systems, an exemplary indexing system may effectively use physical memory hierarchies that include a small amount if intermediate solid-state disk when querying disk-based indexes.

Figure 1B:
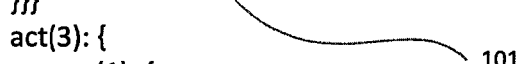
FIG. 1b is an example data fragment that can be stored in an example storage system.

An exemplary indexing system may use a data model of structured, arbitrarily nested objects as shown in FIG. 1a. Each object may have labeled fields that are scalar, text, or nested object values. Object fields may be ordered and field labels may repeat within the same object.

Data schemas may be annotated to indicate that certain string-valued fields should be indexed as full-text fields. For full-text fields, text strings are token-segmented prior to indexing. Each token then becomes a different logical field in the parent object. For example, a text field, my-fulltext-field, may contain a string of ten words. Ten separate text fields, my-fulltext-field(0), my-fulltext-field(1), . . . , my-fulltext-field(9), each containing one word, may be created and stored instead of the system storing the single field, my-fulltext-field with all ten words. Order among tokens may be preserved since field order is preserved.

Applications or users may provide a data schema that may describe data objects, data fields, and data objects' interrelationships of the data to be stored in a database. Within the data model, each scalar value and object value may have a unique key. A key is the list of field labels from the data root to the value. Labels of repeated fields also include the field offset within its object. For example, there may be a data fragment such as the one illustrated in FIG. 1b. The key of token "thine" (101) in the example data fragment may be: play(32).act(1) .scene(3).line(78).text(1). The key of the scene object containing "thine" may be: play(32).act(1).scene(3). Keys may be lexicographically increasing according to a depth-first traversal of the nested-object tree.

Given a unique key for every value and text-token, the entire storage system, or database, can be represented as a keyvalue map such as the one illustrated by FIG. 2. This map can be stored in the storage structure. The data model may also include a schema-concept called a "column" as illustrated in FIG. 3. A column is a list of field labels from the root to an object or value, but does not include the field offset numbers of the key for a particular object or value. The column of the token "thine" (301) in the example is: play-.act.scene.line.text. The column for the scene that contains "thine" is: play.act.scene. All objects and values may have a column derived from their respective keys.

Indexing may be done several different ways. Direct indexing maps (column, value) pairs directly to keys. This type of indexing may be sorted one of two ways. The index may first be sorted on value, then column, and finally key (VCK) order. The index may alternatively be sorted first on column, then value, and finally key (CVK) order.

The decision between VCK order and CVK order depends on query workload and the importance of index compression. CVK order has a compression advantage because columns are fully sorted and may use delta compression. VCK order has better locality properties for descendant-path queries which seek a non-root object containing a descendant with a particular value. For descendant-path type queries, the necessary index entries are clustered in VCK order, but distributed in CVK order. FIG. 3 illustrates an example of a direct index map that contains (column, value, key) triplets.

In positional indexing, each scalar value in the index is assigned an integer position. The position value P is assigned to the Pth scalar value encountered in a depth-first traversal of the nested object-tree. The position space is therefore dense. The maximum position of any scalar value in an index with N scalar values is N−1. For example, using the keyvalue mapping from FIG. 2, the position mapping can be determined for all values in the index as shown in FIG. 4a. "Polonius" is in position 1, with "Hamlet" being in position 0 in FIG. 2. Therefore, "Polonius" is associated with position 1 in FIG. 4a. Since there are 15 entries in the index, the maximum position of any value in the index is 15−1 or 14.

Additionally, object values may be identified by a half-open range of positions [Q, S), where Q is the smallest position of any scalar value under the object, and S is the smallest position value greater than Q of any scalar value not under the object. All positions R such that Q≤R<S are assigned to values under the object. For example, as illustrated in FIG. 4b, the last hit from FIG. 4a is at position 14. Therefore, all half-open ranges in FIG. 4b may have position 15 as their limit.

As illustrated, the index may be broken into two portions. The first portion may map (column, value) pairs to positions. Entries in this portion may be referred to as "ValuePositionHits" and may be sorted by column, value, and then position as illustrated in FIG. 4a. The second portion of the index may map position ranges to keys. Offsets may be stripped from the last field tags of the keys of repeated scalar fields, as this offset is made redundant by the position value. Index entries in this second portion of the index are "RangeKeyHits" as illustrated by the example portion in FIG. 4b. Rather than mapping values directly to the keys of objects that contain them, a positional index maps both values and keys into intermediate position spaces. Conceptually, the position space represents a flattening of a tree of objects via a pre-post traversal.

Figure 5:
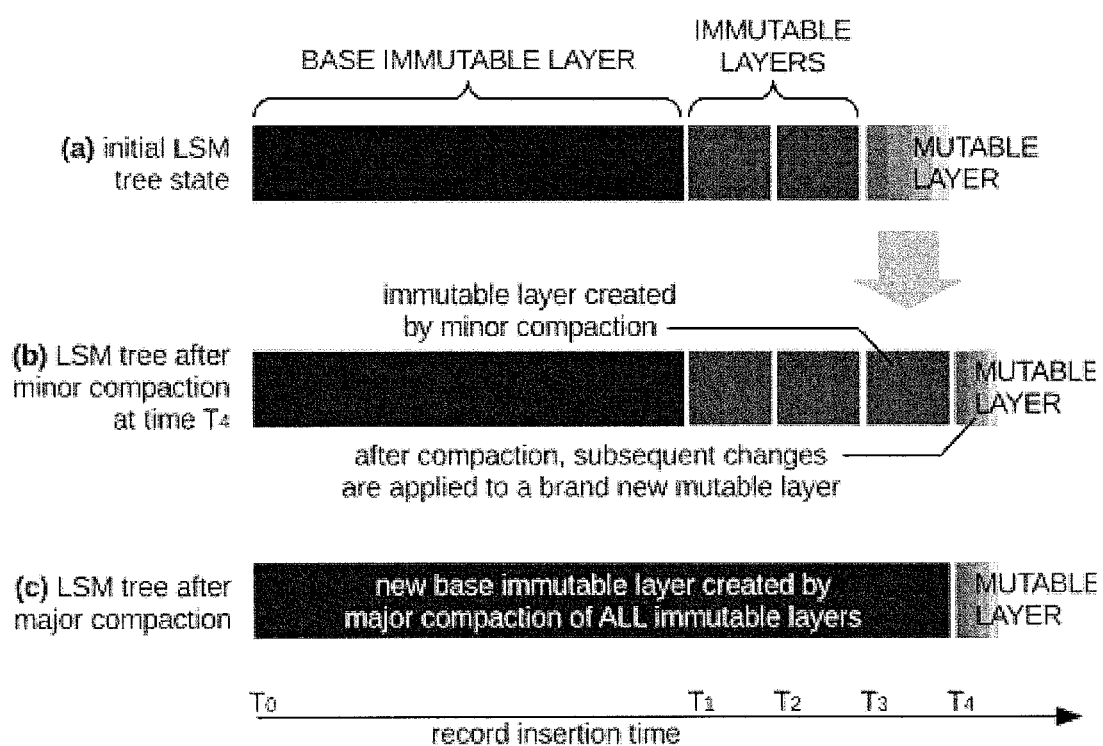
FIG. 5 is an example LSM tree structure.

An exemplary indexing system may index data based on logical position-space encoding and a log-structured merge tree (LSM tree) structure for indexing. In an exemplary system, an LSM tree structure may consist of one or more disk-resident immutable layers, each containing a sorted collection of hits, plus a mutable memory-resident memory layer, referred to as memlayer as illustrated in FIG. 5. Layers may be ordered by how recently the hits that they contain were inserted into the index. For example, in the LSM tree depicted in FIG. 5(a), index entries are inserted before version $T_1$ would appear in the "base immutable layer." Index entries inserted after $T_3$ may appear in the mutable memlayer and index entries inserted between $T_1$ and $T_3$ may appear in one of the intermediate immutable layers.

When reading from an LSM tree, a reader may read and merge results from all layers. Corresponding index entries are added to the mutable memlayer when a new record is indexed. Additionally, upon an object's deletion, tombstone markers for index entries corresponding to that object may be written to the memlayer. Each layer of an LSM tree may be viewed as a delta, or a change, on the collection of all previous layers. This delta reflects all mutations that fall within a well-defined timestamp range. For the index in FIG. 5(a), for example, reading a snapshot between $T_1$ and $T_2$ does not require access into the final immutable layer or the memlayer since all mutations reflected in those layers are guaranteed to have not been applied as of the snapshot timestamp.

As the index grows, layers may be periodically compacted in one of two ways: minor compactions or major compactions. In minor compaction, the mutable memlayer may be frozen and a new empty memlayer may be created at which subsequent modifications can be applied. The frozen layer may be copied in the background to a new immutable layer, after which the frozen memlayer can be deleted. FIG. 5(b) illustrates the result of minor compaction.

In major compaction, all immutable layers are compacted into a new base immutable layer. FIG. 5(c) illustrates the result of a major compaction.

Both minor and major compactions may occur in system background processes. The index files and data structures that comprise the one or more layers being compacted are not deleted until after the compaction is complete so read requests may continue to be served during the compaction process.

When scheduling compactions, systems commonly provision for peak load and plan compaction operations for off-peak times although other factors may also inform compaction scheduling decisions.

Conventional LSM algorithms do not address multiversioning, but instead assume that all modifications are blind inserts. Customary algorithms do not necessarily delete index entries that are created concurrently, but the algorithms make no guarantee about saving them. In a customary LSM algorithm all but the latest version of each record in the index are generally discarded in each compaction.

However, an indexing system can enhance a standard LSM tree to support multiversioning (a) by storing creation and deletion timestamps explicitly alongside each index entry and (b) by not garbage-collecting deleted index entries during compaction. Object deletions and object range deletions may be tracked by inserting explicit tombstone index entries, or hits. Index entries may be sorted within each layer by column, value, and then by timestamp. Deleted index entries may be stored "inline" with live index entries. This type of index may be referred to as a direct inline index.

A direct inline index may show an index entry, or hit, as it existed at any timestamp by going to the index entry and scanning through versions of the index entry to find the version of the index entry with the maximum timestamp proceeding the timestamp in question. For example, if a user or application would like to know the value of an index entry at timestamp 5, a direct inline index may scan through the versions of the index entry to find the version of the entry with the maximum timestamp proceeding timestamp 5.

An exemplary system may create a direct corrected index that allows index readers to skip over index entries that are known to be absent from a given snapshot. In order to determine whether index entries are in a given snapshot, an exemplary system may create two separate sublayers: (1) a final sublayer that may contain exactly those index entries which remain live as of the layer's final timestamp and (2) a correction sublayer which were live at some interval between the start timestamp and final timestamp of the layer, but were deleted before the layer's final timestamp.

Figure 6:
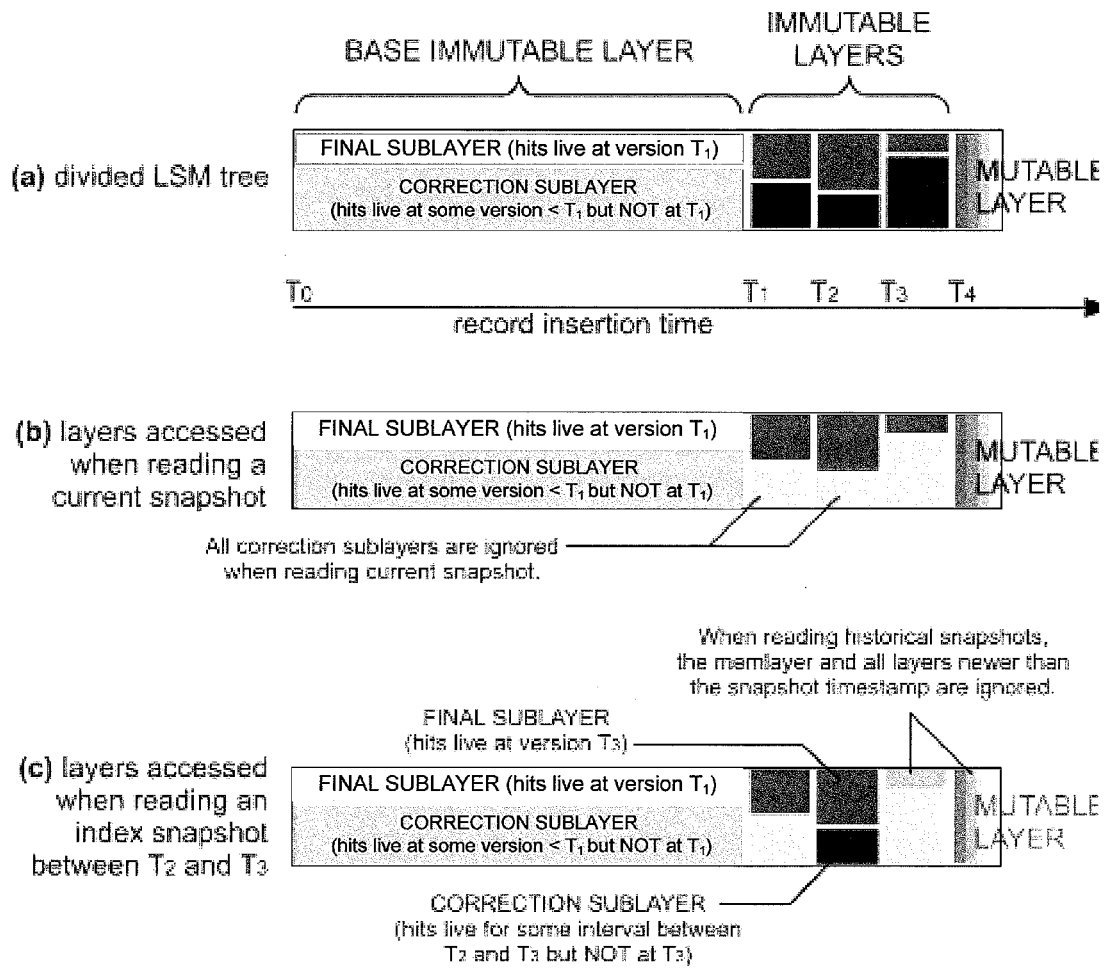
FIG. 6 is an example of a divided LSM tree structure.

FIG. 6(a) illustrates the structure of a divided LSM tree index. The top part of each immutable layer represents the final sublayer and the bottom half represents the correction sublayer.

Index entries that appear in any layer's correction sublayer are guaranteed not to be currently live, so all correction sublayers may be ignored when reading a current snapshot, as illustrated in FIG. 6(b).

When reading a historical index snapshot, at most one correction sublayer ever needs to be considered. FIG. 6(c), for example, highlights the sublayers accessed when reading a historical snapshot between timestamps $T_2$ and $T_3$. The two oldest layers' correction sublayers may be ignored since the index entries in these correction sublayers were deleted before $T_2$. All layers newer than $T_3$ may also be ignored. To merge the correction sublayer (601) with the three final sublayers, the correction sublayer is treated as the "newest" layer, or the last change applied in constructing the historical snapshot between timestamps $T_2$ and $T_3$. The single-version snapshot at $T_3$ may be changed into a multi-versioned collection that can expose any snapshot between $T_2$ and $T_3$.

Each sublayer may additionally be formatted as a positional index. The positional multiversioned index may track liveness for ranges of positions and not for each index entry. Using position-based "liveness maps" provides several advantages including compression of timestamp annotations and faster liveness filtering.

Since each object corresponds to a contiguous sequence of positions and objects may be inserted or deleted all at once, considerable redundancy may be eliminated by annotating position ranges rather than individual index entries with creation and deletion times.

When querying an index snapshot at a particular timestamp, liveness maps for the timestamp may be constructed before any index entries are read. Queries may therefore avoid per-index entry liveness checks that iterate through index entries. Instead, queries may go to index entries with positions that are known to be live at the particular timestamp, bypassing all index entries with positions that fall within non-live position ranges.

Each layer may place index entries in the layer's own independent position space. Different subsets of each position space are live at different timestamps. Managing liveness maps for each sublayer and merging them together to provide a unified view of the entire index for any timestamp is thus non-trivial.

An exemplary system provides a fast mechanism for computing liveness maps for arbitrary timestamps that map live index entries across multiple layers to a single unified position space.

Figure 7:
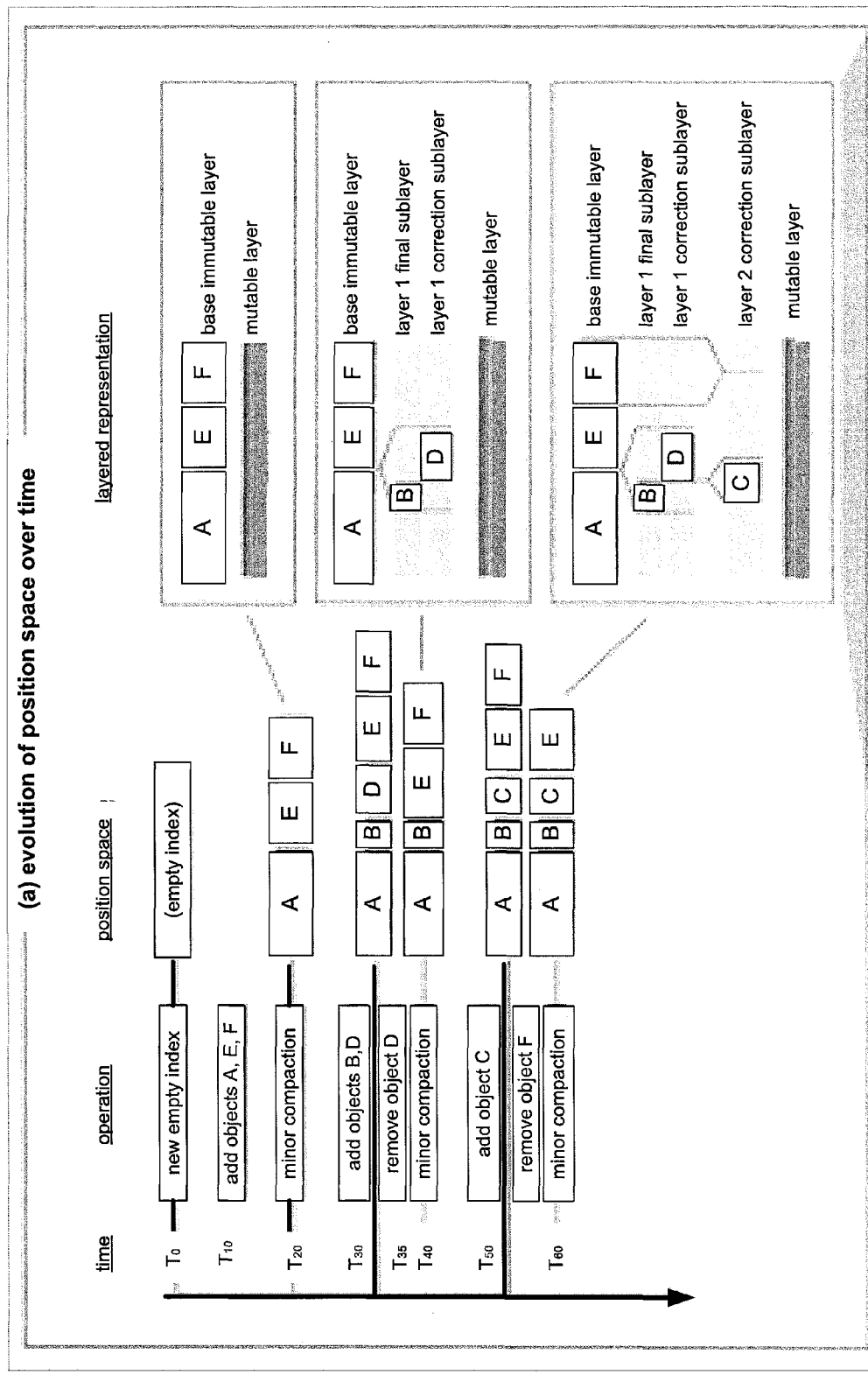
FIG. 7 is an example flow diagram for constructing a three-layer positional multiversioned index in which several objects are added and removed over time.

FIG. 7 depicts the construction of a three-layer positional multiversioned index in which several objects are added and removed over time. This illustration shows a sequence of mutations applied to the index, including compaction operations, and depicts the structure of the position space evolving over time. The collections of index entries that occupy the position spaces shown are omitted from the figure, but each sublayer's position space may be populated by index entries as discussed above.

An exemplary method for positional multiversioning begins with the creation of an empty index at an initial time $T_0$. At a subsequent time, $T_{10}$ for example, objects may be added to the index. FIG. 7 illustrates that objects A, E, and F are added to the index at time $T_{10}$. A minor compaction may be performed to create a base immutable layer. In FIG. 7, a minor compaction occurs at $T_{20}$ to create the base layer. After this compaction, the index entries representing objects in the index occupy consecutive contiguous blocks of positions in the base immutable layer's final sublayer. The base immutable layer's correction layer will be empty since nothing was deleted before the compaction.

At later times, objects may be inserted into and deleted from the index. For example, as shown in FIG. 7, objects B and D are inserted between A and E at $T_{30}$. Object D is then deleted at $T_{35}$. A second compaction may occur and the changes that happened between the first compaction and the second compaction may be reflected in a newly created immutable layer. In FIG. 7, Object B is live at $T_{40}$ and therefore appears in layer 1's final sublayer. Object D, however, appears in layer 1's correction layer because the object was live at some time preceding $T_{40}$, but is no longer live at $T_{40}$ when the compaction occurs.

FIG. 7 shows two more changes being applied before an additional compaction. Object C may be added at $T_{50}$, and object F, which was inserted in the base layer, is removed at $T_{55}$. Object C appears in layer 2's final sublayer. Object F's deletion is represented not by a tombstone as in direct indexes, but by a modification to the liveness map at timestamps following $T_{50}$.

Each sublayer in a positional multiversioned index may store the layer's index entries using a local position space. Each local position space may be dense, meaning that there are no gaps between objects' position ranges. The local position space may begin at position 0. For example, in the bottom right corner of FIG. 7, the layered position space representation at $T_{61}$ is comprised of four sublayers:

base immutable layer (final sublayer) containing A, E, and F
immutable layer 1 (final sublayer) containing B
immutable layer 1 (correction sublayer) containing D
immutable layer 2 (final sublayer) containing C These sublayers may map objects to local positions, giving each object a number of positions approximately proportional to the object's width as shown in FIG. 7. For example, in FIG. 7, Object A may occupy 40 positions, Object B may occupy 10 positions, Object C may occupy 20 positions, Object D may occupy 20 positions, Object E may occupy 30 positions, and Object F may occupy 30 positions. These objects may map to local positions as shown in FIG. 8a.

Since each of the local position spaces may be constructed without any consideration for what positions are occupied in other local position spaces, the index may also create a global position space when exposing an index snapshot. Therefore, when a query iterates through index entries, the query sees each index entry's global positions. A query looking at a snapshot at $T_{31}$ for FIG. 7 may use the mapping shown in FIG. 8b. A snapshot at $T_{61}$ for FIG. 7 may use the mapping shown in FIG. 8c.

Since index entries are stored using local positions only, the positional multiversioned index uses a snapshot-specific mapping between local to global positions to expose only global positions when serving queries. This mapping, called a position shift map (PSM) also serves as a liveness map for the snapshot the map represents by not mapping any local position to a global position if that local position corresponds to a deleted, or not yet inserted, object. FIGS. 9a and 9b illustrate PSMs for snapshots at $T_{31}$ and $T_{61}$.

Since objects may be continuously inserted and deleted, an index uses a different PSM for every timestamp. Although PSMs have a compact internal representation, it would be inefficient to explicitly store full PSMs for every moment in the history of an index. In order to build a PSM for a snapshot at a particular timestamp, an exemplary system may first create a snapshot-specific filter merge list (FML) for each sublayer that may contribute to the snapshot. Sublayers that may contribute to the snapshot include all final sublayers with compaction timestamps preceding the desired timestamp, as well as the final and correction layer for the first immutable layer with a compaction timestamp after the desired timestamp.

A sublayer's FML may specify how to merge the layer's position space with the combined position space of all preceding layers. An example FML may include a sequence of entries, where each entry references ranges in a layer's local position space and includes an instruction regarding how to combine the ranges represented by the entry with the position space generated by merging preceding layers' local position spaces. For the purposes of PSM construction, a layer's final sublayer may be considered to precede its correction layer. Base immutable layers; final layers have trivial FML, since by definition, no layer may precede a base immutable layer. An FML is structured as a sequence of triples as illustrated in FIG. 9, each of which denotes the next step in merging the layer's position space with that of previous position spaces to construct the global position space.

Figure 10A:
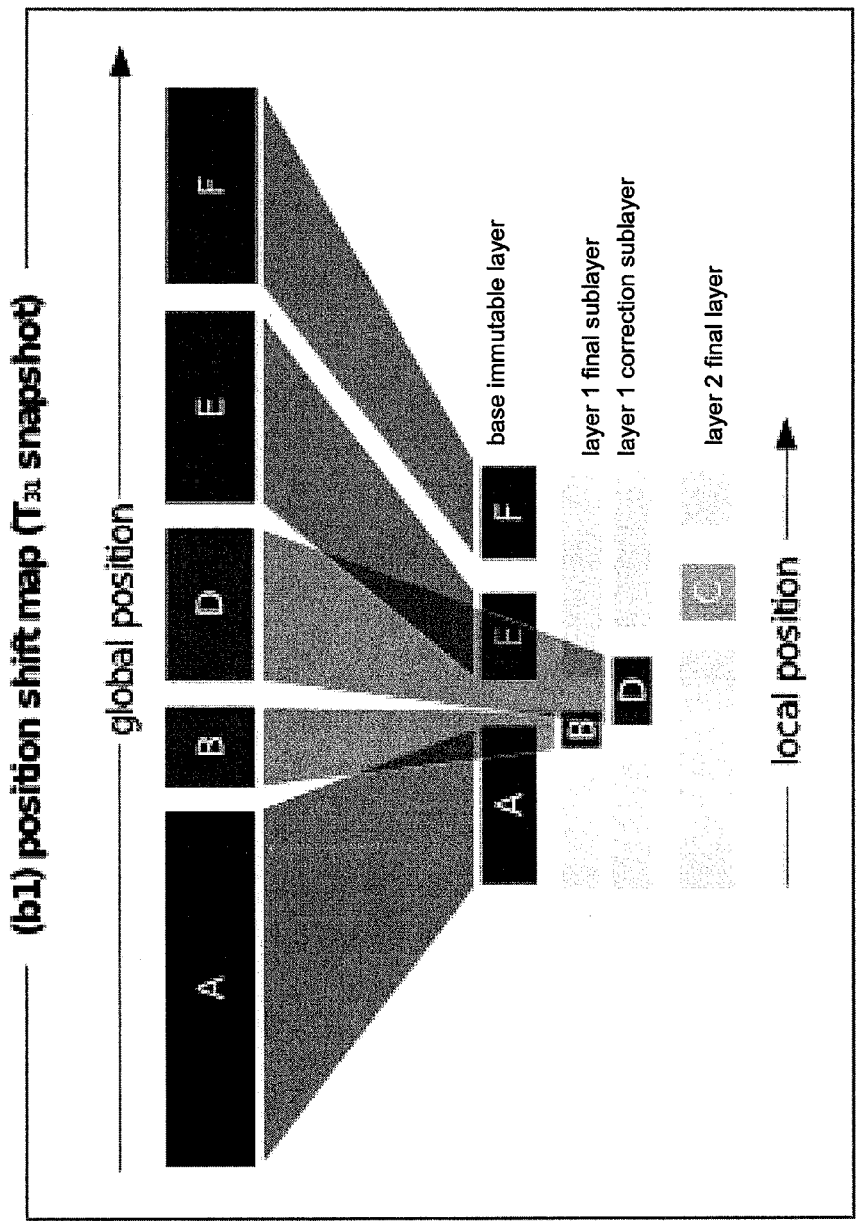
FIG. 10a is an example position shift map for a snapshot at $T_{31}$ as shown in FIG. 7.
Figure 10B:
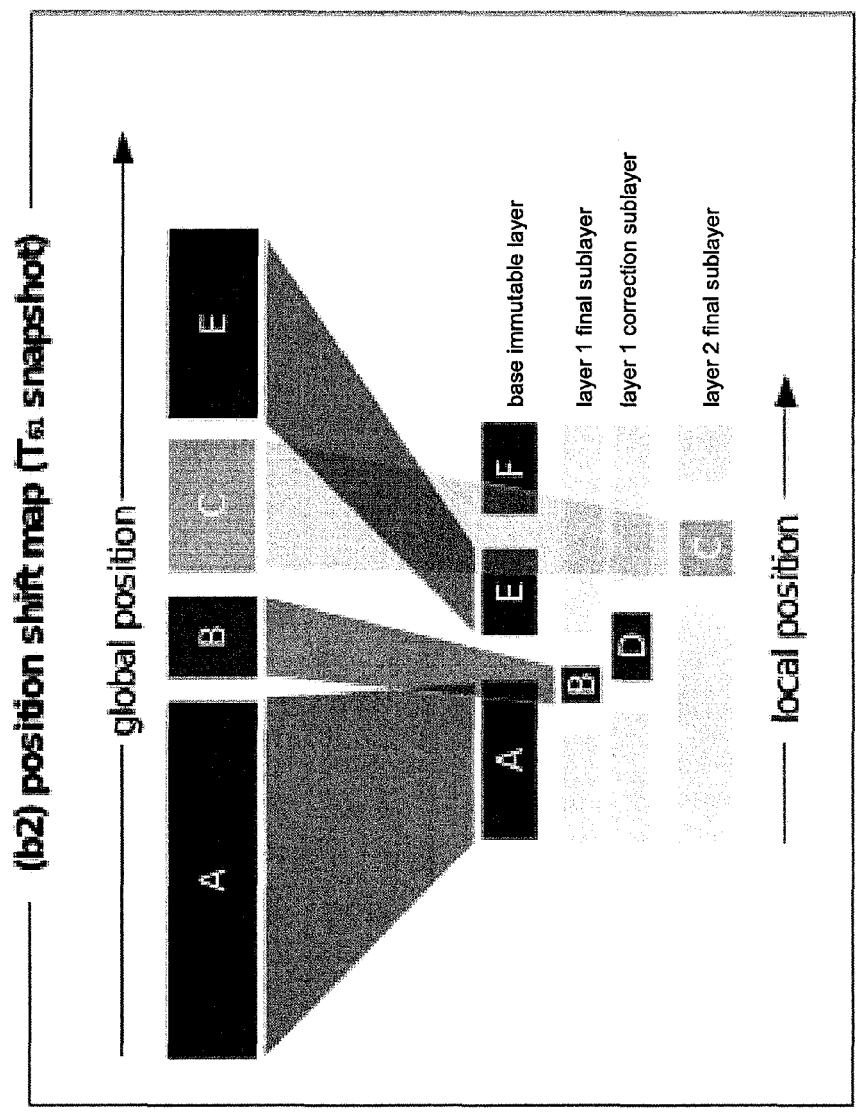
FIG. 10b is an example position shift map for a snapshot at $T_{61}$ as shown in FIG. 7.
Figure 10C:
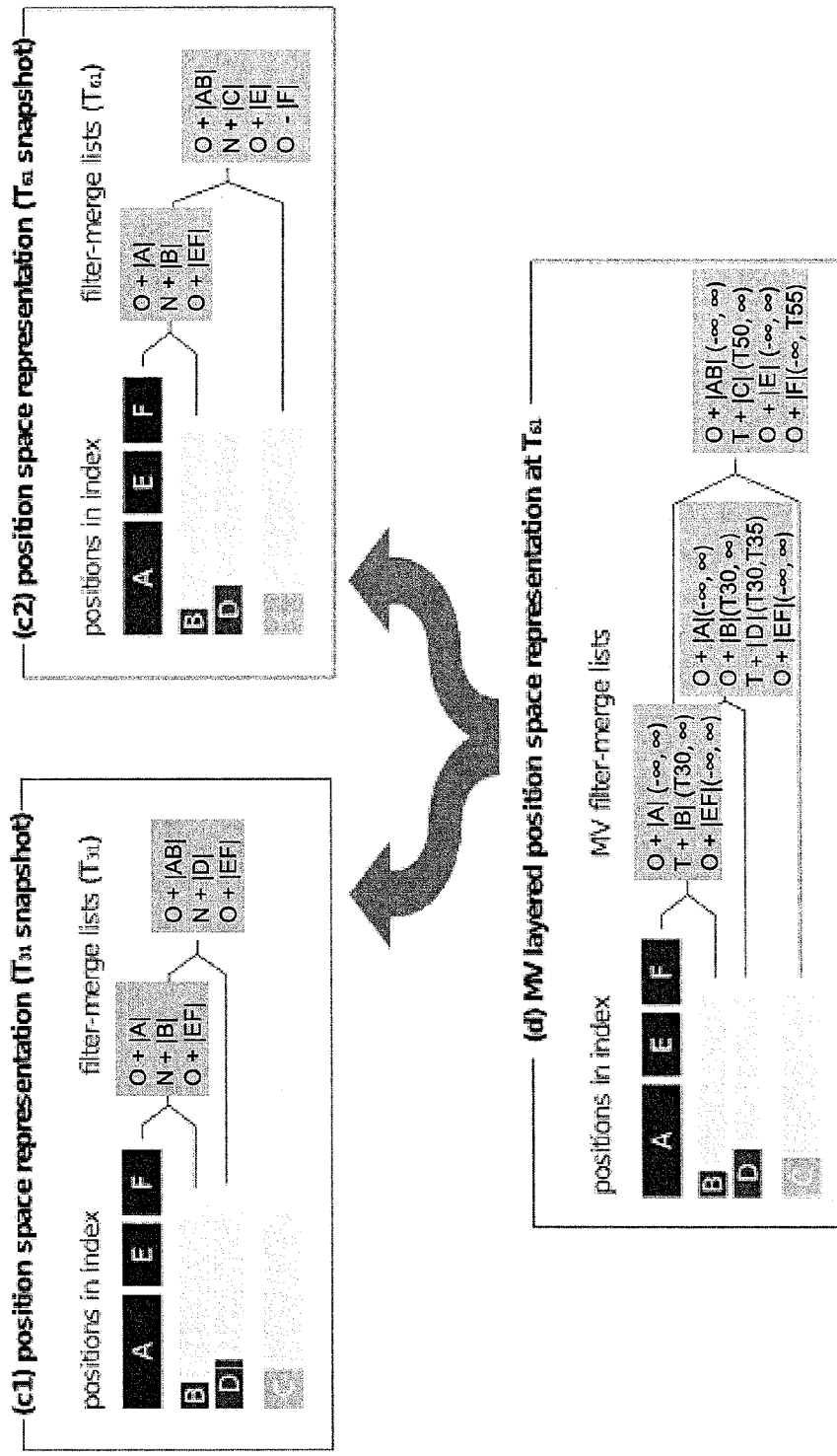
FIG. 10c is an example position space representation for snapshots $T_{31}$ and $T_{61}$ and a multiversioned layered position space representation at $T_{61}$ as shown in FIG. 7.

For example, FIG. 10a and FIG. 10b show the position shift maps for snapshots $T_{31}$ and $T_{61}$ for the index illustrated in FIG. 7. FIGS. 10a and 10b illustrate the relationship between objects' locations in their local position spaces (i.e. physical representations) and their locations in the global position space for a given timestamp. This relationship is the relationship that each PSM encodes. FIG. 10a shows how the local position ranges in FIG. 8a relate to the global position ranges for timestamp T61 in FIG. 8b. Similarly, FIG. 10b shows how the local position ranges for FIG. 8a relate to the global position ranges for timestamp T61 in FIG. 8c. FIG. 10c (d) shows the MVFMLs that may actually be stored with each layer. From these MVFMLs, timestamp-specific FMLs may be created for any timestamp. FIG. 10c (c1) and FIG. 10c (c2) show these derived FMLs for timestamps T31 and T61 respectively.

In FIG. 10c, the first FML merges layer 1's final sublayer with the base layer's final sublayer. The first entry, O+|A|, specifies that the result of this merge beings by including |A| positions from the older layers (the base layer's final sublayer). The next entry, N+|B|, specifies that |B| positions from the newer layer, layer 1's final sublayer, follow and the third entry states that |EF| more positions should be added from the older layers.

The second FML mergers layer 1's correction layer with the output of the above process: first, include |AB| positions from the older layers (layer 1's final sublayer merged with the base immutable layer's final sublayer), then include |D| positions from the newer layer (layer 1's correction sublayer), followed by |EF| positions from the older layers.

Constructing the $T_{61}$ snapshot's PSM as shown in FIG. 10c is trickier since the PSM must reflect the deletion of Object F which is an object that was inserted into the base layer and deleted in layer 2. Constructing the snapshot begins with the same FML as the $T_{31}$ snapshot, but merging layer 1's final sublayer with the base immutable layer's final sublayer as shown in FIG. 10c.

Since this snapshot's timestamp does not precede the compaction timestamp of any existing layer, all correction layers are guaranteed not to contribute to the global position space and may be ignored.

A second FML may merge layer 2's final sublayer with the output of the previous merge. To achieve this merge, positions may be included from an older layer such as |AB| as shown in FIG. 10c. Next, position amounts are added from the newer layer. FIG. 10c shows |C| positions from the newer layer being added. Position amounts may also be added from other older layers, for example |E| positions as shown in FIG. 10c. However, deleted position amounts may be omitted from the PSM to prevent the deleted objects' index entries from being exposed by the snapshot index. In FIG. 10c, the other older layer's next |F| positions corresponding to object F are omitted from the PSM so that index entries associated with object F are not included in the snapshot since object F has been deleted.

Enumerating a collection of FMLs for every historical version of the index may not be easier than storing every PSM. Instead, each sublayer may store a Multi-Versioned Filter Merge list (MVFML), which includes each FML element that could appear in that sublayer's PSM for some snapshot along with an annotation saying which snapshots' FMLs include the element.

The example index from FIG. 7 may store the MVFMLs of FIG. 11.

Each of the MVFMLs may specify how to construct FMLs for any timestamp. In FIG. 10c, the first FML shows that when merging immutable layer 1's final sublayer with that of the base immutable layer, Objects A, E, and F are always included from the older layer. However, object B's position rang is inserted after Object A's position range for snapshots at timestamps greater than $T_{30}$. For snapshots preceding $T_{30}$, the FML instead includes an implicit N−|B|, which specifies that the position range corresponding to object B should not appear in the snapshot's PSM. Similarly, when adding layer 1's correction sublayer into the construction, Object D appears in the PSM only for snapshots at timestamps between $T_{30}$ and and $T_{35}$.

When layer 2's final sublayer is combined with previous layers, Object F's positions may only be included from the older layer if the timestamp precedes T55. Otherwise, the FML instead includes O−|F|, as in the FML for $T_{61}$. Object B's position may always appear in the previous layer, while Object D's positions do not always appear because the sublayer will never contribute an FML to any snapshot whose timestamp precedes $T_{30}$.

In general, snapshot-specific FMLs are not fully materialized, but are instead built lazily during PSM creation time from their respective MVFMLs. The exception to this is that every final sublayer's FML that corresponds to timestamps greater or equal to the layer's minor compaction timestamp is computed once and stored alongside the sublayer's index entries.

Figure 12:
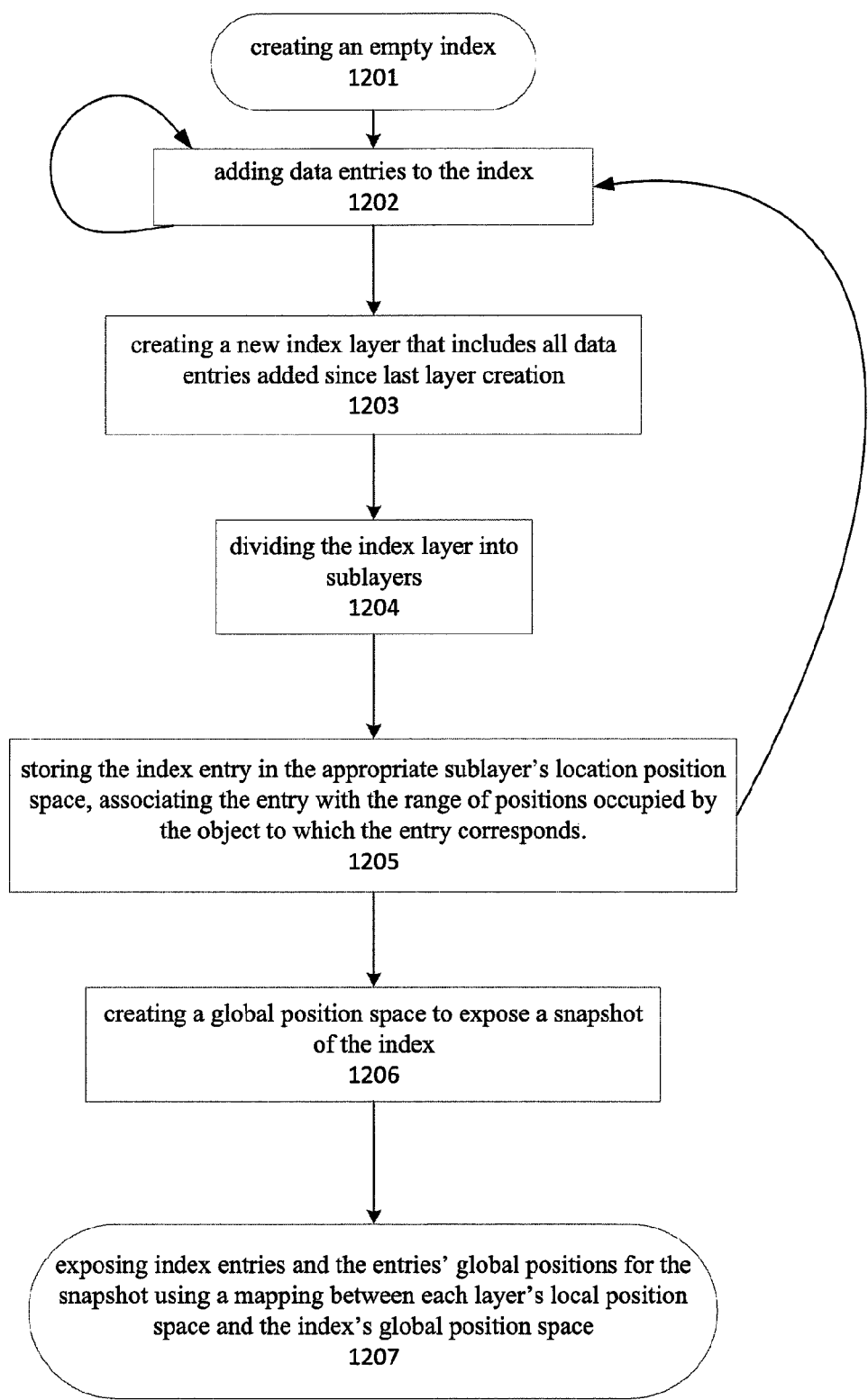
FIG. 12 is a flow diagram illustrating an exemplary multi-versioned position-space indexing process.

An exemplary indexing method may begin with creating an empty index as illustrated in FIG. 12 (1201). At least one index entry may be added to the index (1202). Other index entries may be added to and/or deleted from the index as the index is being built. The index may be compacted to create an index layer that includes all data entries added since the last layer creation (1203). Compaction may occur more than once during the course of building the index with each compaction creating a new layer. The index layers may be divided into sublayers (1204). Index entries may be stored in the appropriate sublayer's local position space and each entry may be associated with the range of positions occupied by the object to which the entry corresponds (1205). A global position space may be created to expose an index snapshot (1206). This snapshot may expose only global positions for each index entry in the snapshot using a snap-shot specific mapping between layer local positions and the index's global positions. A global position space may be generated by creating a multiversioned filter merge list for each sublayer that may contribute to the snapshot. The multiversioned filter merge list may include each filter merge list element in the sublayer along with the time period for which each element is live. For each sublayer, the sublayer's position space may be merged with the combined position space of all layers preceding the sublayer. The index entries and their corresponding global positions may be exposed for the snapshot using the mapping between each layer's local positions and the index's global positions (1207).

Figure 13:
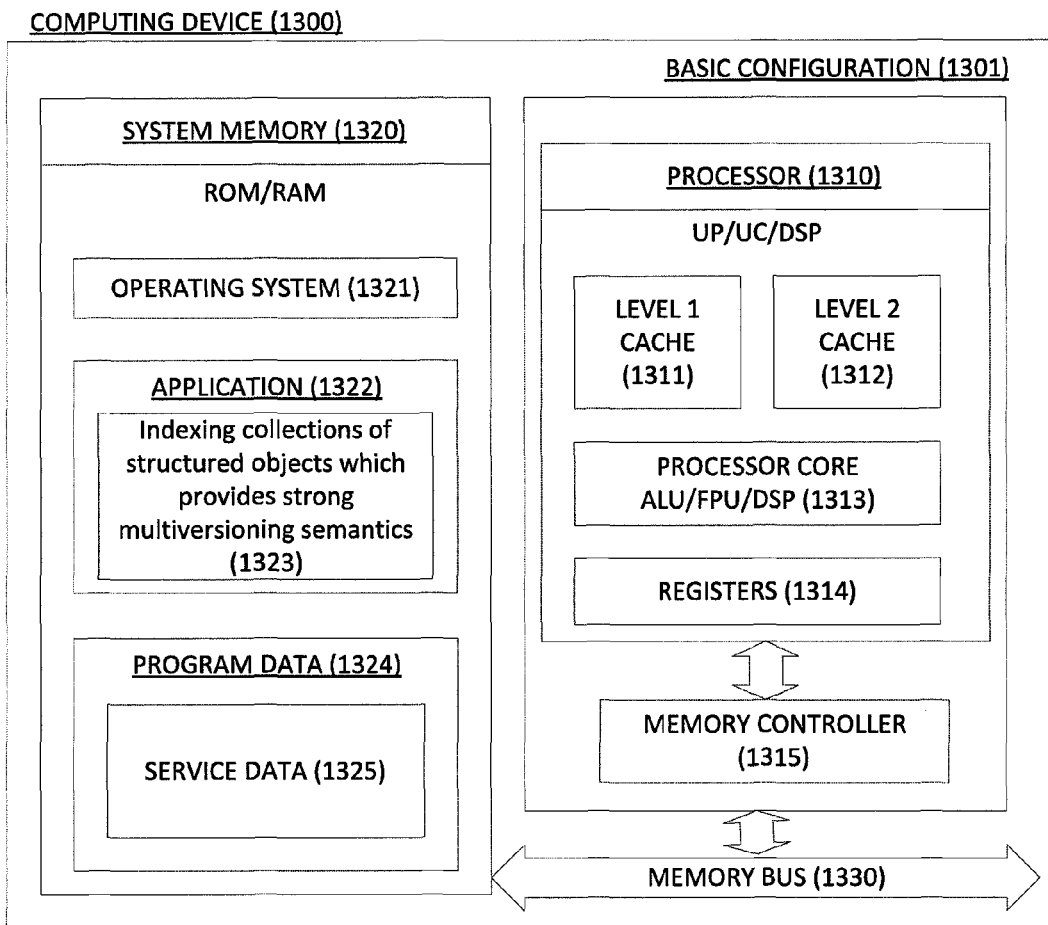
FIG. 13 is a block diagram illustrating an exemplary computing device.

FIG. 13 is a high-level block diagram of an exemplary computer (1300) that is arranged for creating and using a multiversioned position-space index. In a very basic configuration (1301), the computing device (1300) typically includes one or more processors (1310) and system memory (1320). A memory bus (1330) can be used for communicating between the processor (1310) and the system memory (1320).

Depending on the desired configuration, the processor (1310) can be of any type including but not limited to a microprocessor (µP), a microcontroller (µC), a digital signal processor (DSP), or any combination thereof. The processor (1310) can include one more levels of caching, such as a level one cache (1311) and a level two cache (1312), a processor core (1313), and registers (1314). The processor core (1313) can include an arithmetic logic unit (ALU), a floating point unit (FPU), a digital signal processing core (DSP Core), or any combination thereof. A memory controller (1316) can also be used with the processor (1310), or in some implementations the memory controller (1315) can be an internal part of the processor (1310).

Depending on the desired configuration, the system memory (1320) can be of any type including but not limited to volatile memory (such as RAM), non-volatile memory (such as ROM, flash memory, etc.) or any combination thereof. System memory (1320) typically includes an operating system (1321), one or more applications (1322), and program data (1324). The application (1322) may include a system for indexing a collection of structured data. Program Data (1324) includes storing instructions that, when executed by the one or more processing devices, implement a system and method for creating and using a multiversioned position-space index. (1323). In some embodiments, the application (1322) can be arranged to operate with program data (1324) on an operating system (1321).

The computing device (1300) can have additional features or functionality, and additional interfaces to facilitate communications between the basic configuration (1301) and any required devices and interfaces.

System memory (1320) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media can be part of the device (1300).

The computing device (1300) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1300) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for multiversioned position-space indexing of a storage system, the method comprising:
    creating, by data processing hardware, an empty index;
    adding, by the data processing hardware, at least one data entry to the index;
    creating, by the data processing hardware, a new index layer that includes all data entries added since a last layer creation;
    dividing, by the data processing hardware, the index layer into sublayers;
    storing, by the data processing hardware, the index entry in a local position space of an appropriate one of the sublayers, associating the entry with a range of positions occupied by an object to which the entry corresponds;
    creating, by the data processing hardware, a global position space to expose an index snapshot of the index;
    exposing, by the data processing hardware, index entries and the entries' global positions in the snapshot using a mapping between each layer's local position space and the index's global position space;
    querying a particular timestamp of the index snapshot;
    constructing, by the data processing hardware, a liveness map for the particular timestamp before reading any index entries, the liveness map mapping live index entries having positions known to be live at the particular timestamp; and
    exposing, by the data processing hardware, the live index entries in the constructed liveness map while bypassing all non-live index entries having positions that fall within non-live position ranges.

2. The method of claim 1, wherein creating a global position space to expose an index snapshot further comprises:
creating a multiversioned filter merge list for each sublayer that may contribute to the snapshot, the multiversioned filter merge list including each element to be merged in each sublayer along with instructions specifying how to merge each element and a time period for which each element is live; and
for each sublayer, merging the sublayer's position space with a combined position space of the layers preceding the sublayer.

3. The method of claim 1, wherein dividing the index layer into sublayers further comprises creating a final sublayer for the index layer which specifies the index entries added after a start timestamp of the index layer and remain live as of a final timestamp of the index layer.

4. The method of claim 1, wherein dividing the index layer into sublayers further comprises creating a correction sublayer which specifies index entries that were both created and deleted between a start timestamp and an end timestamp of the index layer.

5. The method of claim 1, wherein the empty index is created using a log-structured merge tree structure that comprises one or more immutable layers plus a mutable, memory-resident memlayer.

6. The method of claim 1, wherein the created index is a direct index that maps <column, value> pairs directly to keys.

7. The method of claim 6, further comprising sorting the index first on value, then column, and finally key.

8. The method of claim 6, further comprising sorting the index first on column, then value, and finally key.

9. The method of claim 1, wherein the index has two portions, one portion which maps <column, value> pairs to positions and a second portion that maps position ranges to keys.

10. A system for multiversioned position-space indexing of a storage system, the system comprising:
one or more processing devices; and
one or more storage devices storing instructions that, when executed by the one or more processing devices, cause the one or more processing devices to perform operations comprising:
creating an empty index;
adding at least one data entry to the index;
creating a new index layer that includes all data entries added since a last layer creation;
dividing the index layer into sublayers;
storing the index entry in a local position space of an appropriate one of the sublayers, associating the entry with a range of positions occupied by an object to which the entry corresponds;
creating a global position space to expose an index snapshot of the index;
exposing index entries and the entries' global positions in the snapshot using a mapping between each layer's local position space and the index's global position space;
querying a particular timestamp of the index snapshot;
constructing a liveness map for the particular timestamp before reading any index entries, the liveness map mapping live index entries having positions known to be live at the particular timestamp; and
exposing the live index entries in the constructed liveness map while bypassing all non-live index entries having positions that fall within non-live position ranges.

11. The system of claim 10, wherein the operations further comprise:
creating a multiversioned filter merge list for each sublayer that may contribute to the snapshot, the multiversioned filter merge list including each element to be merged in each sublayer along with instructions specifying how to merge each element and a time period for which each element is live; and
for each sublayer, merging the sublayer's position space with a combined position space of the layers preceding the sublayer.

12. The system of claim 10, wherein the operations further comprise dividing the index layer into sublayers by creating a final sublayer which specifies the index entries added after a start timestamp of the index layer and remain live as of a final timestamp of the index layer.

13. The system of claim 10, wherein the operations further comprise dividing the index layer into sublayers by creating a correction sublayer which specifies index entries that were both created and deleted between a start timestamp and an end timestamp of the index layer.

14. The system of claim 10, wherein the empty index is created using a log-structured merge tree structure that comprises one or more immutable layers plus a mutable, memory-resident memlayer.

15. The system of claim 10, wherein the created index is a direct index that maps <column, value> pairs directly to keys.

16. The system of claim 15, wherein the operations further comprise sorting the index first on column, then value, and finally key.

17. The system of claim 15, wherein the operations further comprise sorting the index first on value, then on column, and finally key.

18. The system of claim 10, wherein the index has two portions, one portion which maps <column, value> pairs to positions and a second portion that maps position ranges to keys.

* * * * *